US012563391B2

(12) United States Patent
Jerichow

(10) Patent No.: US 12,563,391 B2
(45) Date of Patent: Feb. 24, 2026

(54) AUTHENTICATION FAILURE CAUSE NOTIFICATION IN COMMUNICATION SYSTEM

(71) Applicant: Nokia Technologies Oy, Espoo (FI)

(72) Inventor: Anja Jerichow, Grafing bei München (DE)

(73) Assignee: Nokia Technologies Oy, Espoo (FI)

( * ) Notice: Subject to any disclaimer, the term of this patent is extended or adjusted under 35 U.S.C. 154(b) by 422 days.

(21) Appl. No.: 18/108,343

(22) Filed: Feb. 10, 2023

(65) Prior Publication Data

US 2023/0269583 A1 Aug. 24, 2023

Related U.S. Application Data

(60) Provisional application No. 63/311,836, filed on Feb. 18, 2022.

(51) Int. Cl.
 H04W 12/06 (2021.01)
 H04W 4/12 (2009.01)
(52) U.S. Cl.
 CPC ............. H04W 12/06 (2013.01); H04W 4/12 (2013.01)
(58) Field of Classification Search
 CPC . H04W 12/06; H04W 12/068; H04W 12/069; H04W 12/082; H04W 12/35; H04W 12/69; H04W 4/12
 USPC ......................................................... 455/411
 See application file for complete search history.

(56) References Cited

U.S. PATENT DOCUMENTS

| | | | | |
|---|---|---|---|---|
| 6,957,061 | B1 * | 10/2005 | Wright | H04W 12/06 |
| | | | | 455/418 |
| 9,300,643 | B1 * | 3/2016 | Doane | H04L 63/08 |
| 9,876,788 | B1 * | 1/2018 | Ziraknejad | G06F 21/34 |
| 2009/0275353 | A1 * | 11/2009 | Fujita | H04W 36/24 |
| | | | | 455/513 |
| 2010/0083347 | A1 * | 4/2010 | Hinton | H04L 9/3268 |
| | | | | 726/1 |
| 2018/0083782 | A1 * | 3/2018 | Barry | H04L 9/3226 |
| 2019/0208421 | A1 * | 7/2019 | Ziraknejad | H04L 9/0825 |
| 2019/0238555 | A1 * | 8/2019 | Buffard | H04L 63/123 |
| 2020/0159714 | A1 * | 5/2020 | Rawal | G06F 16/27 |
| 2020/0162919 | A1 * | 5/2020 | Velev | H04W 60/00 |

(Continued)

OTHER PUBLICATIONS

3GPP, "3rd Generation Partnership Project; Technical Specification Group Services and System Aspects; Security Architecture and Procedures for 5G System (Release 16)," 3GPP TS 33.501, V16.3.0, Jul. 2020, 248 pages.

(Continued)

*Primary Examiner* — Jean A Gelin
(74) *Attorney, Agent, or Firm* — Ryan, Mason & Lewis, LLP

(57) ABSTRACT
Techniques are disclosed for security management for authentication failure notification in a communication system. For example, a method comprises receiving, at user equipment from a network entity in a communication system, a message comprising an indication of at least one specific cause for a failure in an authentication procedure between the communication system and the user equipment, wherein the at least one specific cause comprises an occurrence of an authentication credential expiration. The user equipment may apply a policy and/or take one or more actions in response to receipt of the message.

20 Claims, 8 Drawing Sheets

(56) References Cited

U.S. PATENT DOCUMENTS

| | | | | |
|---|---|---|---|---|
| 2020/0413468 | A1* | 12/2020 | Chen | H04W 24/04 |
| 2022/0104065 | A1* | 3/2022 | Takakura | H04W 48/06 |
| 2023/0007475 | A1* | 1/2023 | He | H04L 9/085 |
| 2023/0337030 | A1* | 10/2023 | Zeng | H04W 76/15 |
| 2025/0133615 | A1* | 4/2025 | Back | H04W 76/19 |

OTHER PUBLICATIONS

3GPP, "3rd Generation Partnership Project; Technical Specification Group Core Network and Terminals; 5G System; Authentication Server Services; Stage 3 (Release 16)," 3GPP TS 29.509, V16.4.0, Jun. 2020, 60 pages.

3GPP, "3rd Generation Partnership Project; Technical Specification Group Core Network and Terminals; 5G System; Cause Codes Mapping Between 5GC Interfaces; Stage3 (Release 17)," 3GPP TS 29.524 V17.3.0, Dec. 2021, 18 pages.

3GPP, "3rd Generation Partnership Project; Technical Specification Group Core Network and Terminals; Non-Access-Stratum (NAS) protocol for 5G System (5GS); Stage 3; (Release 18)," 3GPP TS 24.501 V18.1.0, Dec. 2022, 1031 pages.

3GPP, "3rd Generation Partnership Project; Technical Specification Group Core Network and Terminals; 5G System; Unified Data Management Services; Stage 3 (Release 18)," 3GPP TS 29.503 V18.0.0, Dec. 2022, 547 pages.

3GPP, "3rd Generation Partnership Project; Technical Specification Group Services and System Aspects; System Architecture for the 5G System; Stage 2 (Release 16)," 3GPP TS 23.501, V16.5.0, Jul. 2020, 441 pages.

3GPP, "3rd Generation Partnership Project; Technical Specification Group Services and System Aspects; Procedures for the 5G System (5GS); Stage 2 (Release 16)," 3GPP TS 23.502, V16.3.0, Dec. 2019, 558 pages.

* cited by examiner

200

204-N

NETWORK ENTITY N

220-N

INTERFACE CIRCUITRY

222-N

PROCESSOR
224-N

SECURITY MANAGEMENT PROCESSING

226-N

MEMORY
228-N

SECURITY MANAGEMENT STORAGE 204-1

NETWORK ENTITY 1

220-1

INTERFACE CIRCUITRY 222-1

PROCESSOR
224-1

SECURITY MANAGEMENT PROCESSING 226-1

MEMORY
228-1

SECURITY MANAGEMENT STORAGE

202

USER EQUIPMENT

210

INTERFACE CIRCUITRY

212

PROCESSOR
214

SECURITY MANAGEMENT PROCESSING

216

MEMORY
218

SECURITY MANAGEMENT STORAGE

FIG. 2

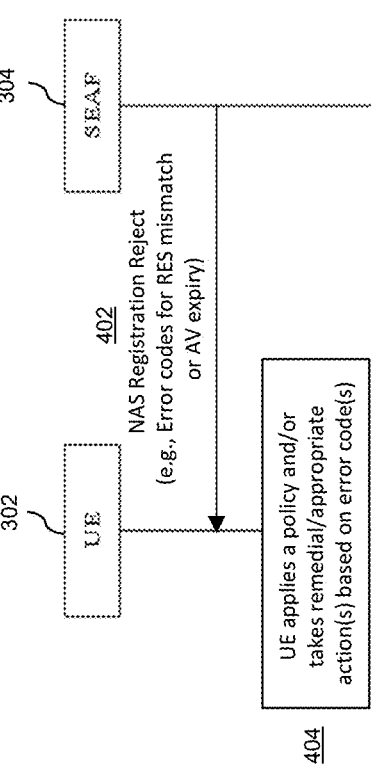
400
304
SEAF
302
UE
402
NAS Registration Reject
(e.g., Error codes for RES mismatch
or AV expiry)
404
UE applies a policy and/or
takes remedial/appropriate
action(s) based on error code(s)
FIG. 4

500

| Data type | P | Cardinality | Response Codes | Description |
|---|---|---|---|---|
| ConfirmationDataResponse | M | 1 | 200 OK | This case indicates that the AUSF has performed the verification of the 5G AKA confirmation. The response body shall contain the result of the authentication and the Kseaf if the authentication is successful.<br><br>If result of the authentication is "Authentication_Failure" eg. due to AV expiry or RES*=/=XRES*, ProblemDetails may shall be sent. |
| | | | 307 Temporary Redirect | Temporary redirection. The response shall include a Location header field containing a different URI. The URI shall be an alternative URI of the resource located on an alternative service instance within the same AUSF or AUSF (service) set. |
| | | | 308 Permanent Redirect | Permanent redirection. The response shall include a Location header field containing a different URI. The URI shall be an alternative URI of the resource located on an alternative service instance within the same AUSF or AUSF (service) set. |
| ProblemDetails | O | 0..1 | 400 Bad Request | This case represents a 5G AKA confirmation failure because of input parameter error. This indicates that the AUSF was not able to confirm the authentication. |
| ProblemDetails | O | 0..1 | 500 Internal Server Error | This case represents a 5G AKA confirmation failure because of a server internal error. |
| ProblemDetails | O | 0..1 | XX AV Expiry Error | This case represents a 5G AKA failure code, if AV was already expired |
| ProblemDetails | O | 0..1 | XX Match Error | This case represents a 5G AKA failure code, if matching RES*≠XRES* fails. |

502

504

506

NOTE:    The mandatory HTTP error status codes for the PUT method listed in Table 5.2.7.1-1 of 3GPP TS 29.500 [4] other than those specified in the table above also apply, with a ProblemDetails data type (see clause 5.2.7 of 3GPP TS 29.500 [4].

FIG. 5

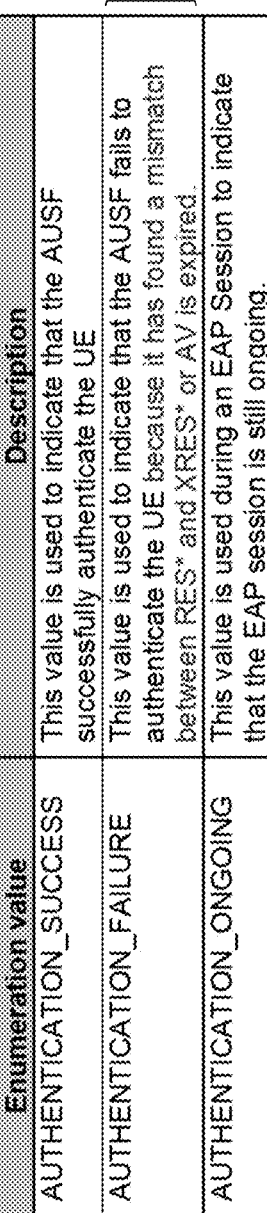

| Enumeration value | Description |
|---|---|
| AUTHENTICATION_SUCCESS | This value is used to indicate that the AUSF successfully authenticate the UE |
| AUTHENTICATION_FAILURE | This value is used to indicate that the AUSF fails to authenticate the UE because it has found a mismatch between RES* and XRES* or AV is expired |
| AUTHENTICATION_ONGOING | This value is used during an EAP Session to indicate that the EAP session is still ongoing. |

| HTTP status code on N12 | Protocol or Application Error | 5GMM cause to UE |
|---|---|---|
| 200 OK | The "authResult" in "ConfirmationDataResponse" is set to "AUTHENTICATION_FAILURE" (see clause 6.1.6.2.8 of 3GPP TS 29.509 [7]). | Cause #3 – Illegal UE |
| | The "authResult" in "EapSession" is set to "AUTHENTICATION_FAILURE" (see clause 6.1.6.2.8 of 3GPP TS 29.509 [7]). | Cause #3 – Illegal UE |
| | The "authResult" in "ConfirmationDataResponse" is set to "AUTHENTICATION_FAILURE" (see clause 6.1.6.2.8 of 3GPP TS 29.509 [7]). | Cause #X – AV expiry |

| Bits 8 | 7 | 6 | 5 | 4 | 3 | 2 | 1 | Cause value (octet 2) |
|---|---|---|---|---|---|---|---|---|
| X | X | X | X | X | X | X | 1 | Illegal UE |
| X | X | X | X | X | X | 1 | 1 | AV expiry |
| X | X | X | X | X | Y | Y | Y | RES* mismatch |
| X | X | X | Y | Y | 1 | 0 | 1 | PEI not accepted |
| 0 | 0 | 0 | 0 | 0 | 1 | 1 | 1 | Illegal ME |
| 0 | 0 | 0 | 0 | 1 | 0 | 0 | 1 | 5GS services not allowed |
| 0 | 0 | 0 | 0 | 1 | 0 | 1 | 1 | UE identity cannot be derived by the network |
| 0 | 0 | 0 | 0 | 1 | 1 | 0 | 0 | Implicitly de-registered |
| 0 | 0 | 0 | 0 | 1 | 1 | 1 | 1 | PLMN not allowed |
| 0 | 0 | 0 | 1 | 0 | 0 | 0 | 0 | Tracking area not allowed |
| 0 | 0 | 0 | 1 | 0 | 0 | 1 | 1 | Roaming not allowed in this tracking area |
| 0 | 0 | 0 | 1 | 0 | 1 | 0 | 1 | No suitable cells in tracking area |
| X | X | X | X | X | X | X | X | Wireline access area not allowed |
| 0 | 0 | 0 | 1 | 0 | 1 | 0 | 0 | MAC failure |
| 0 | 0 | 0 | 1 | 0 | 1 | 1 | 0 | Synch failure |
| 0 | 0 | 0 | 1 | 0 | 1 | 1 | 0 | Congestion |
| 0 | 0 | 0 | 1 | 0 | 1 | 1 | 1 | UE security capabilities mismatch |
| 0 | 0 | 0 | 1 | 1 | 0 | 0 | 0 | Security mode rejected, unspecified |
| 0 | 0 | 0 | 1 | 1 | 0 | 1 | 0 | Non-5G authentication unacceptable |
| 0 | 0 | 0 | 1 | 1 | 0 | 1 | 1 | N1 mode not allowed |
| 0 | 0 | 0 | 1 | 1 | 1 | 0 | 0 | Restricted service area |
| 0 | 0 | 0 | 1 | 1 | 1 | 1 | 1 | Redirection to EPC required |
| 0 | 0 | 1 | 0 | 1 | 0 | 1 | 1 | LADN not available |
| 0 | 1 | 0 | 1 | 1 | 0 | 1 | 0 | No network slices available |
| 0 | 1 | 0 | 1 | 1 | 0 | 1 | 1 | Maximum number of PDU sessions reached |
| 0 | 1 | 0 | 1 | 1 | 1 | 0 | 1 | Insufficient resources for specific slice and DNN |
| 0 | 1 | 0 | 1 | 1 | 1 | 1 | 1 | Insufficient resources for specific slice |
| 1 | 1 | 1 | 1 | 1 | 0 | 0 | 1 | ngKSI already in use |
| 0 | 0 | 0 | 0 | 0 | 0 | 1 | 0 | Non-3GPP access to 5GCN not allowed |
| 0 | 0 | 0 | 0 | 0 | 0 | 0 | 1 | Serving network not authorized |
| 0 | 0 | 0 | 0 | 0 | 1 | 1 | 0 | Temporarily not authorized for this SNPN |
| 1 | 1 | 1 | 1 | 1 | 1 | 1 | 1 | Permanently not authorized for this SNPN |
| 0 | 1 | 0 | 0 | 1 | 1 | 1 | 0 | Not authorized for this CAG or authorized for CAG cells only |
| 0 | 0 | 1 | 1 | 1 | 1 | 1 | 0 | Payload was not forwarded |
| 0 | 0 | 1 | 1 | 1 | 1 | 1 | 1 | DNN not supported or not subscribed in the slice |
| 0 | 1 | 0 | 1 | 1 | 1 | 0 | 0 | Insufficient user-plane resources for the PDU session |
| 0 | 1 | 1 | 0 | 0 | 1 | 1 | 1 | Semantically incorrect message |
| 0 | 1 | 1 | 0 | 1 | 0 | 0 | 1 | Invalid mandatory information |
| 0 | 1 | 1 | 0 | 1 | 0 | 1 | 1 | Message type non-existent or not implemented |
| 0 | 1 | 1 | 0 | 1 | 1 | 0 | 1 | Message type not compatible with the protocol state |
| 0 | 1 | 1 | 0 | 1 | 1 | 1 | 1 | Information element non-existent or not implemented |
| 0 | 1 | 1 | 0 | 0 | 0 | 0 | 0 | Conditional IE error |
| 0 | 1 | 1 | 0 | 0 | 1 | 0 | 1 | Message not compatible with the protocol state |
| 0 | 1 | 1 | 0 | 1 | 1 | 1 | 1 | Protocol error, unspecified |

Any other value received by the mobile station shall be treated as 0110 1111, "protocol error, unspecified". Any other value received by the network shall be treated as 0110 1111, "protocol error, unspecified".

AUTHENTICATION FAILURE CAUSE NOTIFICATION IN COMMUNICATION SYSTEM

RELATED APPLICATION

The present application claims priority to U.S. Provisional Patent Application Ser. No. 63/311,836, filed Feb. 18, 2022 and entitled "Authentication Failure Cause Notification in Communication," which is incorporated by reference herein in its entirety.

FIELD

The field relates generally to communication networks, and more particularly, but not exclusively, to security management in such communication systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," and TS 23.502, entitled "Technical Specification Group Services and System Aspects; Procedures for the 5G System (5GS)," the disclosures of which are incorporated by reference herein in their entireties. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues can present a significant challenge, especially with respect to mutual authentication processes between the UE and a communication network.

SUMMARY

Illustrative embodiments provide techniques for security management for authentication failure notification in a communication system.

For example, in one illustrative embodiment from a perspective of user equipment, a method comprises receiving, at user equipment from a network entity in a communication system, a message comprising an indication of at least one specific cause for a failure in an authentication procedure between the communication system and the user equipment, wherein the at least one specific cause comprises an occurrence of an authentication credential expiration. In a further illustrative embodiment, the user equipment may apply a policy and/or take one or more actions in response to receipt of the message.

By way of further example, in one illustrative embodiment from a perspective of a network entity, a method comprises generating, in a network entity in a communication system, a message comprising an indication of at least one specific cause for a failure in an authentication procedure between the communication system and user equipment, wherein the at least one specific cause comprises an occurrence of an authentication credential expiration. In a further illustrative embodiment, when the network entity generating the message is part of a home network of the communication system, the network entity may send the message to a network entity in a visited network of the communication system. In yet another illustrative embodiment, when the network entity generating the message is part of a visited network of the communication system, the network entity sends the message to the user equipment.

In further embodiments, an occurrence of a challenge-response mismatch may be an additional or alternative indication in the message of the at least one specific cause for the failure in the authentication procedure between the communication system and the user equipment.

Still further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, a UE and/or one or more network entities are notified of a specific cause of an authentication failure enabling the UE and/or the one or more network entities to take a remedial or otherwise appropriate next action and/or apply a different policy.

These and other features and advantages of embodiments described herein will become more apparent from the accompanying drawings and the following detailed description.

BRIEF DESCRIPTION OF THE DRAWINGS

FIG. 2 illustrates user equipment and network entities with which one or more illustrative embodiments may be implemented.

FIG. 4 illustrates a process for authentication failure cause notification between user equipment and a communication system according to an illustrative embodiment.

FIGS. 5-8 illustrate message structures and/or definitions for authentication failure cause notification according to an illustrative embodiment.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other details that one of ordinary skill in the art will realize. For example, 5G TS 29.509, entitled "Technical Specification Group Core Network and Terminals; 5G System; Authentication Server Services; Stage 3," 5G TS 29.524, entitled "Technical Specification Group Core Network and Terminals; 5G System; Cause Codes Mapping Between 5GC Interfaces; Stage 3," and 5G TS 24.501, entitled "Technical Specification Group Core Network and Terminals; Non-Access-Stratum (NAS) protocol for 5G System (5GS); Stage 3," the disclosures of which are incorporated by reference herein in their entireties, may be mentioned below or otherwise applicable in the context of some illustrative embodiments. However, while well-suited for 5G-related 3GPP standards, embodiments are not necessarily intended to be limited to any particular standards.

Prior to describing illustrative embodiments, a general description of certain main components of a 5G network will be described below in the context of FIGS. 1 and 2, followed by a description of an existing process for UE onboarding to such a 5G network.

Figure 1:
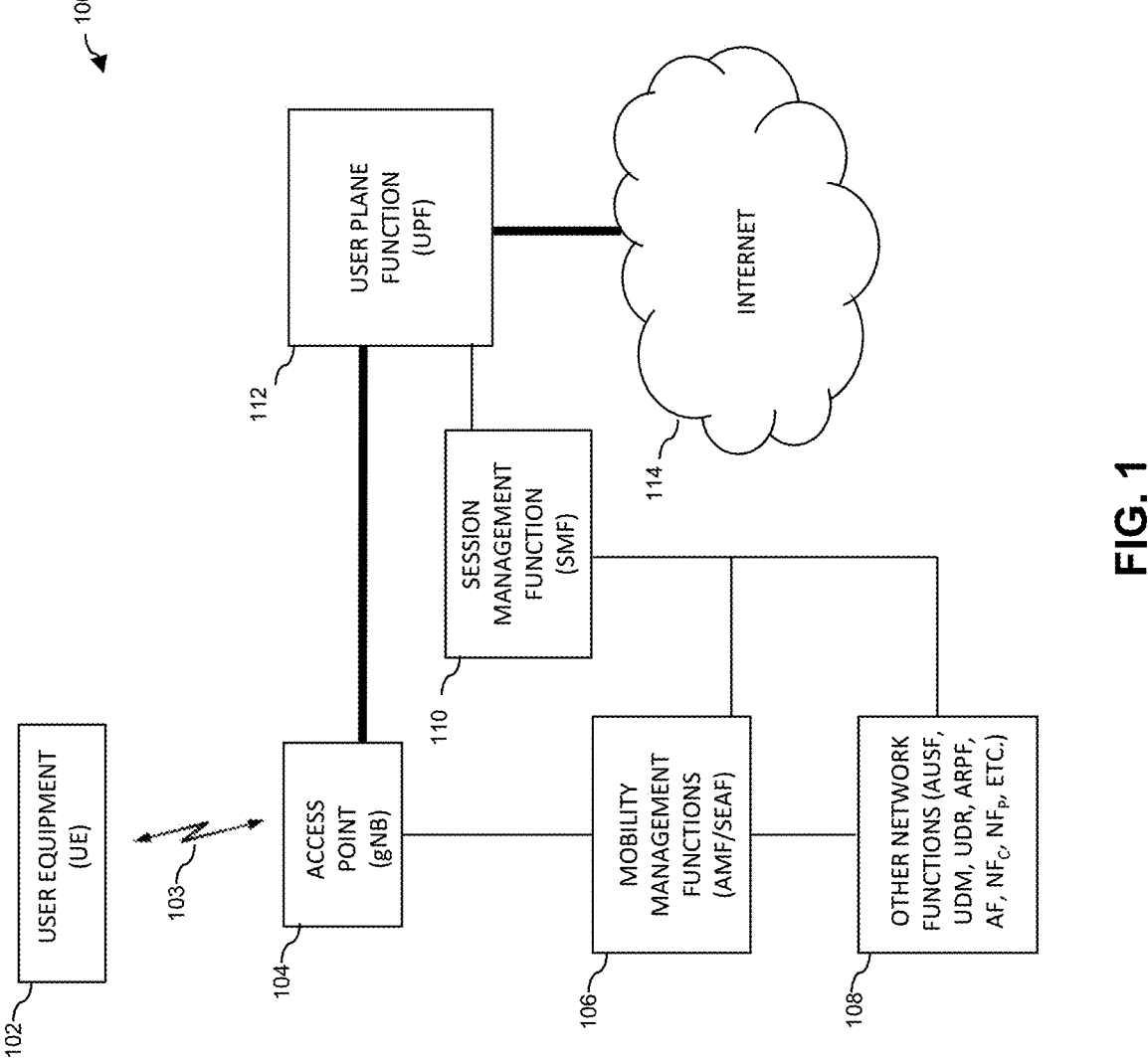
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. It is to be understood that UE 102 may use one or more other types of access points (e.g., access functions, networks, etc.) to communicate with the 5G core other than a gNB. By way of example only, the access point 104 may be any 5G access network such as an N3IWF (Non-3GPP Interworking Function), a TNGF (Trusted Non-3GPP Gateway Function) or a W-AGF (Wireline Access Gateway Function) or may correspond to a legacy access point (e.g., eNB).

The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI). Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility operations with the UE (through the access point 104). The AMF may also be referred to herein, more generally, as an access and mobility management entity.

The AMF 106 in this illustrative embodiment is operatively coupled to other network functions 108. As shown, some of functions 108 may include a Unified Data Management (UDM) function, a Unified Data Repository (UDR), an Authentication Credential Repository and Processing (ARPF) function, as well as an Authentication Server Function (AUSF). The AUSF, UDM, UDR, and ARPF (separately or collectively) are also referred to herein, more generally, as an authentication entity. In addition, functions 108 may include, but are not limited to, an Application Function (AF), and other network functions that can act as service producers (NFp) and/or service consumers (NFc). Note that any network function can be a service producer for one service and a service consumer for another service. Further, when the service being provided includes data, the data-providing NFp is referred to as a data producer, while the data-requesting NFc is referred to as a data consumer. A data producer may also be an NF that generates data by modifying or otherwise processing data produced by another NF.

Note that a UE, such as UE 102, is typically subscribed to what is referred to as a Home Public Land Mobile Network (HPLMN) in which some or all of the functions 106 and 108 reside. The HPLMN is also referred to as the Home Environment (HE). If the UE is roaming (not in the HPLMN), it is typically connected with a Visited Public Land Mobile Network (VPLMN) also referred to as a visited network, while the network that is currently serving the UE is also referred to as a serving network. In the roaming case, some of the network functions 106 and 108 can reside in the VPLMN, in which case, functions in the VPLMN communicate with functions in the HPLMN as needed. However, in a non-roaming scenario, mobility management functions 106 and the other network functions 108 reside in the same communication network, i.e. HPLMN. Embodiments described herein are not limited by which functions reside in which PLMN (i.e., HPLMN or VPLMN).

Note that in one or more illustrative embodiments, the SEAF is part of a VPLMN and serves as a go-between authentication entity for mutual authentication procedures between the UE and the authentication entities AUSF/UDM/ARPF which are part of a HPLMN.

The access point 104 is also operatively coupled (via one or more of functions 106 and/or 108) to a serving gateway function, i.e., Session Management Function (SMF) 110, which is operatively coupled to a User Plane Function (UPF) 112. UPF 112 is operatively coupled to a Packet Data Network, e.g., Internet 114. Note that the thicker solid lines in this figure denote a user plane (UP) of the communication network, as compared to the thinner solid lines that denote a control plane (CP) of the communication network. It is to be appreciated that Internet 114 in FIG. 1 may additionally or alternatively represent other network infrastructures including, but not limited to, cloud computing infrastructure and/or edge computing infrastructure. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the communication system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

FIG. 2 is a block diagram illustrating computing architectures for various participants in methodologies according to illustrative embodiments. More particularly, system 200 is shown comprising user equipment (UE) 202 and a plurality of network entities 204-1, . . . , 204-N. For example, in illustrative embodiments and with reference back to FIG. 1, UE 202 can represent UE 102, while network entities 204-1, . . . , 204-N can represent functions 106 and 108. It is to be appreciated that the UE 202 and network entities 204-1, . . . , 204-N are configured to interact to provide security management and other techniques described herein.

The user equipment 202 comprises a processor 212 coupled to a memory 216 and interface circuitry 210. The processor 212 of the user equipment 202 includes a security management processing module 214 that may be implemented at least in part in the form of software executed by the processor. The security management processing module 214 performs security management described in conjunction with subsequent figures and otherwise herein. The memory 216 of the user equipment 202 includes a security management storage module 218 that stores data generated or otherwise used during security management operations.

Each of the network entities (individually or collectively referred to herein as 204) comprises a processor 222 (222-1, . . . , 222-N) coupled to a memory 226 (226-1, . . . , 226-N) and interface circuitry 220 (220-1, . . . , 220-N). Each processor 222 of each network entity 204 includes a security management processing module 224 (224-1, . . . , 224-N) that may be implemented at least in part in the form of software executed by the processor 222. The security management processing module 224 performs security management operations described in conjunction with subsequent figures and otherwise herein. Each memory 226 of each network entity 204 includes a security management storage module 228 (228-1, . . . , 228-N) that stores data generated or otherwise used during security management operations.

The processors 212 and 222 may comprise, for example, microprocessors such as central processing units (CPUs), application-specific integrated circuits (ASICs), digital signal processors (DSPs) or other types of processing devices, as well as portions or combinations of such elements.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 and 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

Further, the memories 216 and 226 may more particularly comprise, for example, electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment 202 and plurality of network entities 204 are configured for communication with each other as security management participants via their respective interface circuitries 210 and 220. This communication involves each participant sending data to and/or receiving data from one or more of the other participants. The term "data" as used herein is intended to be construed broadly, so as to encompass any type of information that may be sent between participants including, but not limited to, identity data, key pairs, key indicators, security management messages, registration request/response messages and data, request/response messages, authentication request/response messages and data, metadata, control data, audio, video, multimedia, other messages, etc.

It is to be appreciated that the particular arrangement of components shown in FIG. 2 is an example only, and numerous alternative configurations may be used in other embodiments. For example, any given network element/ function can be configured to incorporate additional or alternative components and to support other communication protocols.

Other system elements such as gNB 104, SMF 110, and UPF 112 may each be configured to include components such as a processor, memory and network interface. These elements need not be implemented on separate stand-alone processing platforms, but could instead, for example, represent different functional portions of a single common processing platform.

More generally, FIG. 2 can be considered to represent processing devices configured to provide respective security management functionalities and operatively coupled to one another in a communication system.

As mentioned above, the 3GPP TS 23.501 defines the 5G system architecture as service-based, e.g., Service-Based Architecture (SBA). It is realized herein that in deploying different NFs, there can be many situations where an NF may need to interact with an entity external to the SBA-based 5G core network (e.g., including the corresponding PLMN(s), e.g., HPLMN and VPLMN). Thus, the term "internal" as may be used herein illustratively refers to operations and/or communications within the SBA-based 5G core network (e.g., SBA-based interfaces) and the term "external" illustratively refers to operations and/or communications outside the SBA-based 5G core network (non-SBA interfaces).

Given the above general description of some illustrative features of a 5G network, technical problems with existing mutual authentication between the UE and the communication network, and solutions proposed in accordance with illustrative embodiments, will now be described herein below.

Figure 3:
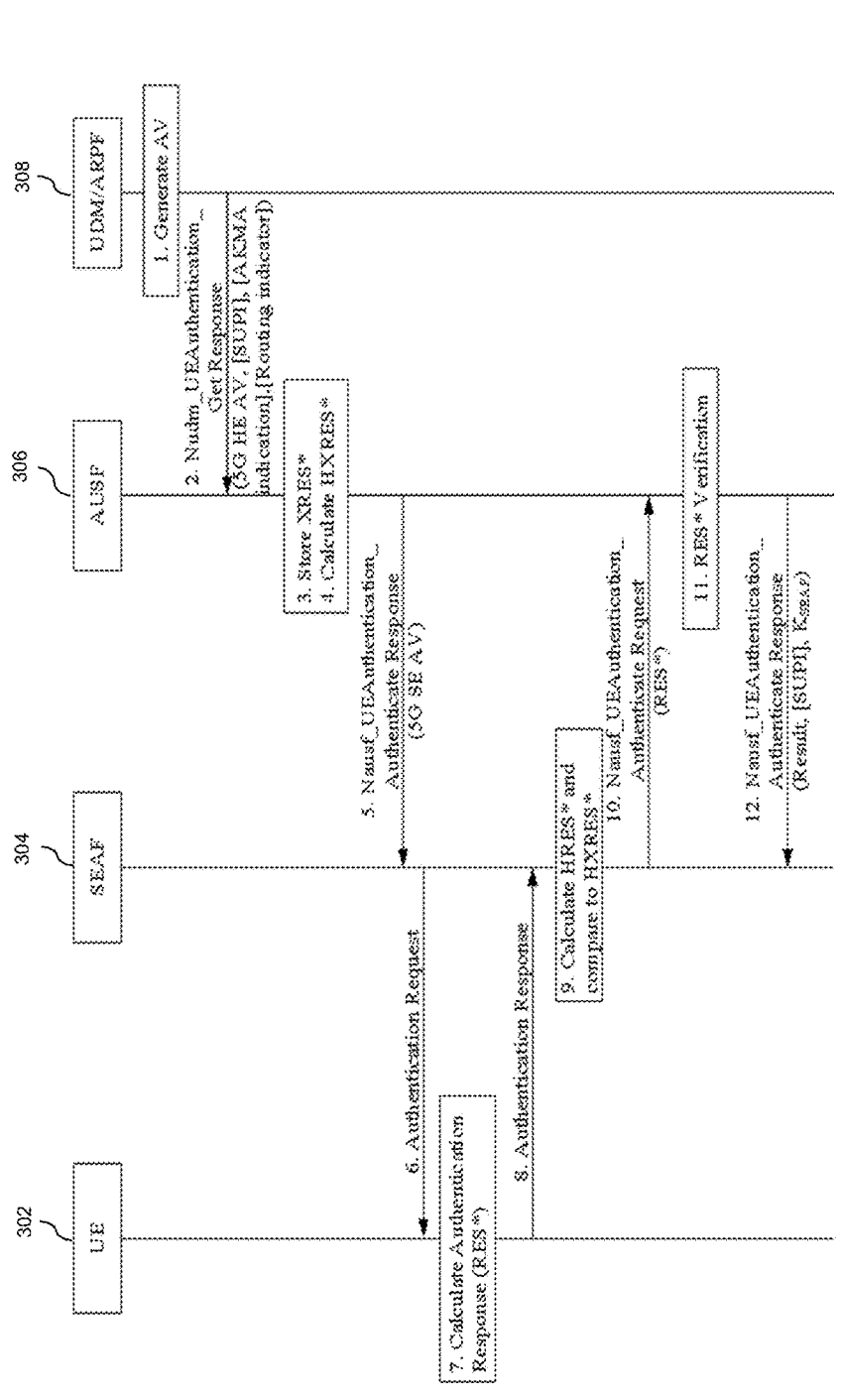
FIG. 3 illustrates a process for mutual authentication and key agreement between user equipment and a communication system with which one or more illustrative embodiments may be implemented.

FIG. 3 illustrates an authentication procedure 300 for 5G AKA (authentication and key agreement) such as specified in the above-referenced TS 33.501 (FIG. 6.1.3.2-1). Note that annexes mentioned below in authentication procedure 300 refer to the above-referenced TS 33.501.

As shown in FIG. 3, a UE 302, an SEAF 304, a AUSF 306, and a UDM/ARPF 308 participate in the authentication procedure 300. The numbers 1-12 in FIG. 3 correspond to the enumerated steps 1-12 described below. Authentication procedure 300 proceeds as follows:

1. For each Nudm_Authenticate_Get Request, UDM/ARPF 308 creates a 5G HE AV (Authentication Vector). UDM/ARPF 308 does this by generating an AV with the Authentication Management Field (AMF) separation bit set to '1" as defined in TS 33.102 [9]. UDM/ARPF 308 then derives $K_{AUSF}$ (as per Annex A.2) and calculates XRES* (as per Annex A.4). UDM/ARPF 308 creates a 5G HE AV from RAND, AUTN, XRES*, and $K_{AUSF}$. 2. UDM/ARPF 308 then returns the 5G HE AV to AUSF 306 together with an indication that the 5G HE AV is to be used for 5G AKA in a Nudm_UEAuthentication_Get Response. In case SUCI was included in the Nudm_UEAuthentication_Get Request, UDM/ARPF 308 includes the SUPI in the Nudm_UEAuthentication_Get Response after deconcealment of SUCI.

If a subscriber has an Authentication and Key Management for Applications (AKMA) subscription, UDM/ARPF 308 includes the AKMA indication and routing indicator in the Nudm_UEAuthentication_Get Response.

3. AUSF 306 stores the XRES* temporarily together with the received SUCI or SUPI. 4. AUSF 306 then generates the 5G AV from the 5G HE AV received from UDM/ARPF 308 by computing the HXRES* from XRES* (according to Annex A.5) and $K_{SEAF}$ from $K_{AUSF}$ (according to Annex A.6), and replacing the XRES* with the HXRES* and $K_{AUSF}$ with $K_{SEAF}$ in the 5G HE AV.

5. AUSF 306 then removes the $K_{SEAF}$ and returns the 5G SE AV (RAND, AUTN, HXRES*) to SEAF 304 in a Nausf_UEAuthentication_Authenticate Response.

6. SEAF 304 sends RAND, AUTN to UE 302 in a NAS message Authentication Request. This message also includes the ngKSI that will be used by UE 302 and AMF (not expressly shown in FIG. 3 but understood to be part of block 304 along with SEAF) to identify the KANT and the partial native security context that is created if the authentication is successful. This message also includes the Anti-Bidding down Between Architectures (ABBA) parameter. SEAF 304 sets the ABBA parameter as defined in Annex A.7.1. In UE 302, the ME forwards the RAND and AUTN received in NAS message Authentication Request to the USIM. The ABBA parameter is included to enable the bidding down protection of security features.

7. At receipt of the RAND and AUTN, the USIM of UUE 302 verifies the freshness of the received values by checking whether AUTN can be accepted as described in TS 33.102 [9]. If so, the USIM computes a response RES. The USIM returns RES, CK, IK to the ME. If the USIM computes a Kc (i.e., GPRS Kc) from CK and IK using conversion function c3 as described in TS 33.102 [9], and sends it to the ME, then the ME ignores such GPRS Kc and does not store the GPRS Kc on the USIM or in the ME. The ME then computes RES* from RES according to Annex A.4. The ME calculates $K_{AUSF}$ from CK∥IK according to clause A.2. The ME calculates $K_{SEAF}$ from $K_{AUSF}$ according to clause A.6. An ME accessing 5G checks during authentication that the "separation bit" in the AMF field of AUTN is set to 1. The "separation bit" is bit 0 of the AMF field of AUTN. This separation bit in the AMF field of AUTN cannot be used anymore for operator specific purposes as described by TS 33.102 [9], Annex F.

8. UE 302 returns RES* to SEAF 304 in a NAS message Authentication Response.

9. SEAF 304 then computes HRES* from RES* according to Annex A.5, and SEAF 304 compares HRES* and HXRES*. If they coincide, SEAF 304 considers the authentication successful from the serving network point of view. If not, SEAF 304 proceeds as described in sub-clause 6.1.3.2.2. If UE 302 is not reached, and the RES* is never received by SEAF 304, SEAF 304 considers authentication as failed, and indicates a failure to AUSF 306.

10. The SEAF shall send RES*, as received from the UE, in a Nausf_UEAuthentication_Authenticate Request message to the AUSF.

11. Upon successful authentication, AUSF 306 stores the $K_{AUSF}$ based on the home network operator's policy according to clause 6.1.1.1. AUSF 306 compares the received RES* with the stored XRES*. If the RES* and XRES* are equal, AUSF 306 considers the authentication as successful from the home network point of view. AUSF 306 informs UDM/ARPF 308 about the authentication result.

12. AUSF 306 indicates to SEAF 304 in the Nausf_U-EAuthentication_Authenticate Response whether the authentication was successful or not from the home network point of view. If the authentication was successful, the KSAEF is sent to SEAF 304 in the Nausf_UEAuthentication_Authenticate Response. In case the AUSF received a SUCI from SEAF 304 when the authentication was initiated, and if the authentication was successful, then AUSF 306 also includes the SUPI in Nausf_UEAuthentication_Authenticate Response.

Accordingly, in authentication procedure 300:

a value XRES* is temporarily stored in AUSF 306 at step 3;

a value HXRES* is calculated by AUSF 306 at step 4;

a value RES* is calculated by UE 302 at step 7 and sent to SEAF 304 at step 8;

a value HRES* is calculated by SEAF 304 at step 9, and authentication is successful if HRES*=HXRES*;

at step 10, SEAF 304 sends RES*, as received from UE 302, to AUSF 306;

at step 11, AUSF 306 compares the received RES* with the stored XRES*, and AUSF 306 considers authentication successful if RES*=XRES*.

It is realized herein that there are technical shortcomings with authentication procedure 300. By way of one example, if AV is requested too earlier (as will be explained further below), it can happen that AV has already expired at the time when used by SEAF 304 and the RES* is returned to AUSF 306 in the Authentication Confirmation message. Usually, AV should be requested in a just-in-time manner and only one AV can typically be requested at a time. However, for example, for reauthentication or some other reason, the visited network may have already requested a new AV for a follow up authentication step already ahead, thus causing this AV possibly to be already expired and no longer valid when used by SEAF 304 for sending the authentication challenge to UE 302.

In this case, when AV is already expired and therefore the check at AUSF 306 is not successful, the HTTP status code sent back to SEAF 304 is still specified as 200 OK but authResult in ConfirmationData Response is set to AUTHENTICATION_FAILURE, which is mapped to 5GMM cause in UE 302 to Illegal UE. This may be a valid cause if there is a mismatch RES*≠HRES*, but it is not correct for the described use case, i.e., RES*=HRES* in AUSF 306 is verified but AV is expired. While the AV expiration situation may happen relatively infrequently, illustrative embodiments realize that UE 302 should still be informed about the cause of the unsuccessful authentication, i.e., either RES*≠XRES* (RES* mismatch) or AV being expired.

In the existing case of AV expiry and UE 302 being rejected by "illegal UE", UE 302 may erroneously put the base station/PLMN on a blacklist and not reattempt registration/reauthentication therewith. That is, even though UE 302 performed all the correct authentication steps, and even though SEAF 304 also had no authentication issue, the earlier requested AV was already expired according to the home network operator policy. This may occur in one illustrative scenario when an AV is requested too earlier, e.g., when foreseeing reauthentication likely to occur sooner or later, SEAF 304 wants to be prepared and initiates a request for new authentication credentials, i.e., a new AV.

Accordingly, illustrative embodiments realize UE 302 should receive a specific cause as to why it was rejected. In the case of AV expiry, UE 302 would then have a different policy (e.g., take a different remedial or other appropriate action) than in the case of another cause of rejection. For example, UE 302 should not blacklist the PLMN ID in the case of AV expiry, which is a network failure.

In initial authentication, this AV expiry scenario should not happen. However, once UE 302 is known to the VPLMN, SEAF 304 (AMF/SEAF) can ask AUSF 306 for another 5G AV to reauthenticate. There is no rule given when SEAF 304 would get this 5G AV, thus in this case, UE 302 may be asked (RAND/AUTN) for reauthentication and then still get a rejection because the 5G AV has lingered too long (stale) at SEAF 304. As such, existing UE 302 behaviour is unclear in this case.

Thus, illustrative embodiments propose that AUSF 306 provides, in its authentication response message, correct details on the cause of authentication failure, which SEAF 304 can translate in a detailed 5GMM message. In this way only can UE 302 distinguish if the problem is on the UE side or on the network side. Equally, the visited network can only then distinguish if the problem is on the home network side or the UE side. Therefore, in one or more illustrative embodiments, message definitions and protocols (e.g., described in 5G specifications which describe UE to core network protocols including, but not limited to, the above-referenced TS 33.501, 29.509, 29.524, and 24.501) are adapted or modified to specify these authentication failure causes such that mutual authentication procedures between UE and communication network can be improved.

Referring now to FIG. 4, a process 400 is shown for authentication failure cause notification between UE 302 and the visited/serving network, i.e., SEAF 304, according to an illustrative embodiment. For example, in some embodiments, process 400 could occur following procedure 300 in FIG. 3.

More particularly, in step 402 of FIG. 4, SEAF 304 provides the authentication result within the NAS Registration Reject message to UE 302 which specifies a cause (e.g., one or more error codes) for an authentication failure, i.e., RES* mismatch or AV expiry. It is assumed that SEAF 304 has been similarly notified of the specific cause for authentication failure by another network entity (e.g., AUSF 306). Note that a RES* mismatch event can be more generally referred to herein as a challenge-response mismatch event, and an AV expiry event can be more generally referred to herein as an authentication credential expiration event.

In this way, in step 404 of FIG. 4, UE 302 can perform remedial or other appropriate action(s), i.e., apply a policy, as mentioned above. For example, advantageously, UE 302 would apply a policy that avoids blacklisting the visited network when mutual authentication fails due to an AV expiry scenario.

While illustrative embodiments are not intended to be limited to any particular telecommunication standards or messaging protocols, FIGS. 5-8 illustrate adaptations to message structures and/or definitions for authentication failure cause notification according to some of the 5G specifications.

For example, FIG. 5 illustrates a table 500 which is a modification to Table 6.1.3.3.3.1-3 in the above-referenced TS 33.501 that specifies, as denoted by reference numeral 502, for a ConfirmationDataResponse for response code 200 OK, that if the result of authentication is "Authentication_Failure" due to AV expiry or RES*≠XRES*, then ProblemDetails such as are specified by reference numerals 504 and 506 are to be sent.

FIG. 6 illustrates a table 600 which is a modification of Table 6.1.6.3.4-1 in the above-referenced TS 29.509 that specifies, as denoted by reference numeral 602, that the Authentication_Success value is used to indicate that AUSF 306 fails to authenticate UE 302 because it has found a mismatch between RES* and XRES* or AV is expired.

FIG. 7 illustrates a table 700 which is a modification of Table 4.2.2.3-1 in the above-referenced TS 29.524 that specifies, as denoted by reference numeral 702, that the HTTP status code 200 OK additionally maps to a 5GMM cause sent to UE 302 indicating an AV expiry event caused the authentication failure.

Lastly, FIG. 8 illustrates a table 800 which is a modification of Table 9.11.3.2.1 in the above-referenced TS 24.501 that specifies, as denoted by reference numeral 802, a 5GMM cause information element for an AV expiry event and a 5GMM cause information element for and RES* mismatch event.

Thus, AUSF 306 informs SEAF 304 of the authentication failure with specific cause (FIG. 6), from which AMF/SEAF 304 can determine that this is AV expiry or RES* mismatch and AMF/SEAF 304 sends the information (error cause) in a NAS registration reject to UE 302 (FIG. 7).

As explained above, illustrative embodiments are not limited to the above standards or message formats referenced in FIGS. 5-8, but rather are more generally applicable to any communication network implementations wherein user equipment and one or more network entities in the communication network are notified of the reason or reasons for an authentication failure.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:

at least one processor; and at least one memory storing instructions that, when executed by the at least one processor, cause the apparatus at least to:

receive, as part of an authentication procedure between a communication system and the apparatus, an authentication challenge generated based at least in part on an authentication vector generated by the communication system;

provide, as part of the authentication procedure between the communication system and the apparatus, a response to the authentication challenge;

receive a message comprising an indication of at least one specific cause for a failure in the authentication procedure between the communication system and the apparatus, wherein the at least one specific cause comprises an occurrence of an authentication credential expiration of the authentication vector generated by the communication system which is utilized in generating the authentication challenge received by the apparatus; and apply a policy and/or take one or more actions based on receipt of the message.

2. The apparatus of claim 1, wherein the at least one specific cause further comprises an occurrence of a challenge-response mismatch.

3. The apparatus of claim 2, wherein the processor causes the apparatus to connect to an access and mobility management function; and wherein the access and mobility management function compares an expected authentication response to a received authentication response.

4. The apparatus of claim 3, wherein the access and mobility management function further determines whether the authentication vector is expired.

5. The apparatus of claim 4, wherein the access and mobility management determination that the authentication vector is expired results in the apparatus receiving the message comprising the indication of the at least one specific cause for the failure in the authentication procedure being the occurrence of the authentication credential expiration.

6. The apparatus of claim 3, wherein the access and mobility management determination that the expected authentication response and the received authentication response comprise different values results in the apparatus receiving the message comprising the indication of the at least one specific cause for the failure in the authentication procedure being the occurrence of the challenge-response mismatch.

7. The apparatus of claim 2, wherein the occurrence of the challenge- response mismatch causes the apparatus to apply a policy to eliminate a connection to the communication system; and wherein the occurrence of the authentication credential expiration causes the apparatus to apply a policy to maintain a connection to the communication system.

8. A method comprising:

receiving, as part of an authentication procedure between a communication system and user equipment, an authentication challenge at the user equipment, the authentication challenge being generated based at least in part on an authentication vector generated by the communication system;

providing, as part of the authentication procedure between the communication system and the user equipment, a response to the authentication challenge;

receiving, at the user equipment from a network entity in the communication system, a message comprising an indication of at least one specific cause for a failure in the authentication procedure between the communication system and the user equipment, wherein the at least one specific cause comprises an occurrence of an authentication credential expiration of the authentication vector generated by the communication system which is utilized in generating the authentication challenge received by the user equipment; and applying a policy and/or taking one or more actions based on receipt of the message.

9. The method of claim 8, wherein the at least one specific cause further comprises an occurrence of a challenge-response mismatch.

10. The method of claim 9, further comprising comparing an expected authentication response to a received authentication response.

11. The method of claim 10, further comprising determining whether the authentication vector is expired.

12. The method of claim 11, wherein the determination that the authentication vector is expired results in receiving the message comprising the indication of the at least one specific cause for the failure in the authentication procedure is the occurrence of the authentication credential expiration.

13. The method of claim 10, wherein the comparing the expected authentication response and the received authentication response indicates that the expected authentication response and the received authentication response comprise different values, receiving the message comprising the indication of the at least one specific cause for the failure in the authentication procedure being the occurrence of the challenge-response mismatch.

14. The method of claim 9, further comprising applying a policy to eliminate a connection to the communication system wherein the occurrence of the challenge-response mismatch is indicated; and further comprising applying a policy to maintain a connection to the communication system wherein the occurrence of the authentication credential expiration is indicated.

15. A non-transitory computer-readable medium comprising program instructions that, that when executed by an apparatus, cause the apparatus to perform at least the following:

receiving, as part of an authentication procedure between a communication system and user equipment, an authentication challenge at the user equipment, the authentication challenge being generated based at least in part on an authentication vector generated by the communication system;

providing, as part of the authentication procedure between the communication system and the user equipment, a response to the authentication challenge;

receiving, at the user equipment from a network entity in the communication system, a message comprising an indication of at least one specific cause for a failure in the authentication procedure between the communication system and the user equipment, wherein the at least one specific cause comprises an occurrence of an authentication credential expiration of the authentication vector generated by the communication system which is utilized in generating the authentication challenge received by the user equipment; and applying a policy and/or taking one or more actions based on receipt of the message.

16. The non-transitory computer-readable medium of claim 15, wherein the at least one specific cause further comprises an occurrence of a challenge-response mismatch.

17. The non-transitory computer-readable medium of claim 16, wherein the apparatus to connects to an access and mobility management function; and wherein the access and mobility management function compares an expected authentication response to a received authentication response.

18. The non-transitory computer-readable medium of claim 17, wherein the access and mobility management function further determines whether the authentication vector is expired.

19. The non-transitory computer-readable medium of claim 18, wherein the access and mobility management determination that the authentication vector is expired results in the apparatus receiving the message comprising the indication of the at least one specific cause for the failure in the authentication procedure being the occurrence of the authentication credential expiration.

20. The non-transitory computer-readable medium of claim 17, wherein the access and mobility management determination that the expected authentication response and the received authentication response comprise different values results in the apparatus receiving the message comprising the indication of the at least one specific cause for the failure in the authentication procedure being the occurrence of the challenge-response mismatch.

* * * * *